United States Patent
Stähler

[11] Patent Number: 6,039,873
[45] Date of Patent: Mar. 21, 2000

[54] PROCESS FOR THE THOROUGHGOING AEROBIC BIOLOGICAL PURIFICATION OF WASTE WATER

[76] Inventor: Theo Stähler, Niederzeuzheim - Mühlenhof, D-65589 Hadamar 2, Germany

[21] Appl. No.: 09/117,614
[22] PCT Filed: Jan. 30, 1997
[86] PCT No.: PCT/EP97/00411
§ 371 Date: Sep. 11, 1998
§ 102(e) Date: Sep. 11, 1998
[87] PCT Pub. No.: WO97/28094
PCT Pub. Date: Aug. 7, 1997

[30] Foreign Application Priority Data
Feb. 2, 1996 [DE] Germany ............... 196 03 690

[51] Int. Cl.[7] ................ C02F 3/00; C02F 3/30
[52] U.S. Cl. .............. 210/605; 210/615; 210/619; 210/620; 210/739; 210/903; 210/906
[58] Field of Search .................. 210/605, 615, 210/617, 623, 624, 739, 784, 803, 619, 620, 903, 906

[56] References Cited

U.S. PATENT DOCUMENTS

| | | |
|---|---|---|
| 1,971,796 | 8/1934 | Scott . |
| 3,839,198 | 10/1974 | Shelef . |
| 4,160,724 | 7/1979 | Laughton . |
| 4,173,531 | 11/1979 | Matsch et al. . |
| 4,289,626 | 9/1981 | Knopp et al. . |
| 4,421,648 | 12/1983 | Besik . |
| 4,488,968 | 12/1984 | Hong et al. . |
| 4,800,021 | 1/1989 | Desbos . |
| 4,895,645 | 1/1990 | Zorich, Jr. . |
| 4,994,391 | 2/1991 | Hoffmann . |
| 5,352,357 | 10/1994 | Perry . |

*Primary Examiner*—David A. Simmons
*Assistant Examiner*—Fred Prince
*Attorney, Agent, or Firm*—Max Fogiel

[57] ABSTRACT

A method for biological purification of wastewater in which nitrogen phosphorous compounds are biologically degraded in a biotank. The biotank is operated with suspended activated sludge and with fixed film biomass for producing purified water that is directly removable from the tank. Oxygen input to the biotank is controlled and regulated for operating the tank under different oxygen environmental conditions. An aerobic zone is formed near the water surface of the tank, and an anoxic zone is formed near the bottom of the tank. At least one transition zone connects the aerobic zone and the anoxic zone. The method produces a total concentration exceeding 3 kilograms of dry solids per cubic meter of suspended activated sludge and fixed film biomass in the tank volume that is used.

17 Claims, 1 Drawing Sheet

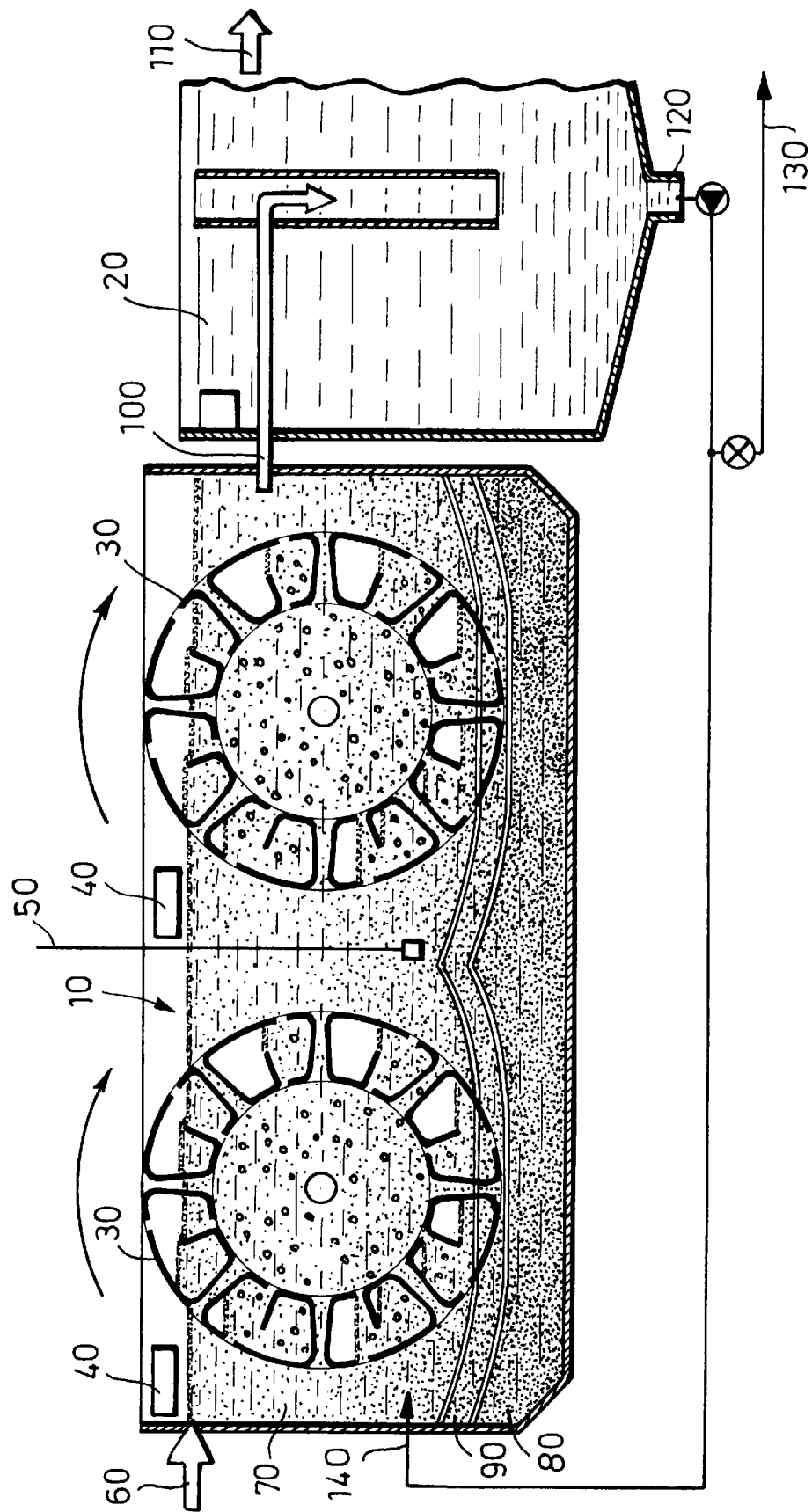

PROCESS FOR THE THOROUGHGOING AEROBIC BIOLOGICAL PURIFICATION OF WASTE WATER

BACKGROUND OF THE INVENTION

The invention relates to biological treatment of wastewaters using a combination (a true hybrid system) of the activated sludge and the rotating disc filter process (fixed film process). In special the subject of the invention is the simultaneous and integrated nitrification and denitrification as well as the advanced biological P-elimination (luxury-P-uptake).

The elimination of the N- and P-components in a wastewater treatment plant mostly occurs by using biological processes for the elimination of the nitrogen-components (nitrification/denitrification). In most cases phosphates are reduced by chemical processes (chemical precipitation, coagulation and floculation using chemicals with ferrous, alum or calcium compounds). Biological methods for the P-elimination were developed in the last years. They base on an increased incorporation of phosphates into the cells of the microorganisms of the activated sludge, which is higher than usual by an activated sludge microorganism. (see: ATV (1989): Biologische Phosphorentfernung, Journal "Korrespondenz Abwasser" 36, pp 337–348 and Kunst,S, "Untersuchungen zur biologischen Phosphorelimination im Hinblick auf ihre abwassertechnische Nutzung", Institute for water pollution degredation of the University of the city Hannover, publication number 77 (1990).

All techniques for the elimination of the N- and P-compounds are called "advanced wastewater treatment" or "third-stage-treatment".

Fixed film reactors, which are preadded ore joined after an activated sludge biotank, are known from the papers DE-A 29 14 689 or DE-A 31 40 372. To the fixed film reactors—as already mentioned—the so-called RBC-systems (Rotating Biological Contactors or rotating disc filters) as well as the aircatching rotating biological contact aerators will belong, which rotate around a horizontal central shaft and which consists in their cells of a series of plates attached in a defined space, for example made of plastic or similar materials. Construction and operation of the contact aerators are described among other things in the above mentionend papers.

An aircatching rotating biological contact aerator, rotating around a horizontal central shaft (cell segment contact aerator) can be used on the one hand in the function of a trickling filter used in the wastewater treatment technique as a fixed film reactor. So nitrifying bacteriums for the oxidation of the nitrogen compounds can grow in the fixed film so that nitrification is guaranteed.

On the other hand it is possible to adjust the desired mixing of the biotank by using the contact aerators so that a separate mixing and stirring equipment is not necessary.

Actual informations says that it was not yet succesful to integrate an advanced biological P-elimination process into a nitrification/denitrification-system in such a way, that only one tank will be necessary, so that the advanced biological P-elimination in combination with nitrification and denitrification will work simultaneously integrated in the same tank volume.

SUMMARY OF THE INVENTION

Nevertheless it is possible by using a technique for the biological advanced wastewater treatment, where optionally presettled wastewater is supplied to a biotank having both sessile as well as suspended biomass, in which nitrogen- and phosphate-compounds are advanced degradated biologically and where the so-treated purified wastewater is removed from the biotank.

Through it working with a technique of the above mentioned kind different oxygen conditions in the different areas in the biotank are maintained by controlling the oxygen input so that nearby the liquid surface of the biotank an aerobic zone and at the bottom of the biotank an anoxic zone is established which are optionally connected with one another through one ore more transition zones and that the concentration of the biomass as a total of the suspended activated sludge and of the fixed film biomass amounts to more than 3 kg dry solids per $m^3$ in the liquid of the biotank, it is possible in a not foreseeable way to guarantee a true simultaneously working integrated nitrification and denitrification in combination with an advanced biological P-elimination (luxury-P-uptake) for the purification of a wastewater. Using the combination and the therefore concluded synergetic cooperation of keeping up of distinct oxygen environments in different areas or in different water levels of the biotank and working with higher concentrations of biomass as in usual activated sludge systems effect a higher efficiency, a more economical operation and lower maintenance costs compared to other well known techniques.

With the claimed invention different oxygen environments are established in different areas or zones of a biotank or an activated sludge tank. The purification processes in the different zones or areas are influenced by these oxygen environments. Independent of the oxygen environment the organic carbon components will always be degradated. Mainly the advanced purification processes nitrification, denitrification and biological P-uptake will be influenced specificely keeping up different specific loading rates.

Nitrification is reached priorly in the aerobic environment in the aerobic areas, which are situated nearby the water surface in the biotank or the activated sludge tank. The aerobic environment of this zones is characterized by the existing of dissolved oxygen or in case of chemically combined oxygen, e.g. nitrate produced during the nitrification of the ammonium compounds.

Contrary to this process the denitrification processes will work in the anoxic environments, which are characteristic for the anoxic zones or aereas which are established nearby the bottom of the biotank or the activated sludge tank. The anoxic environment respectively the zones or aereas with a dominant anoxic environment are characterized by the partial or total lack of dissolved oxygen and the existing of chemically combined oxygen.

In accordance to the claimed invention the different aerobic and anoxic environmental zones are respectively connected with one another through one or more transition zones. Preference is given to a continuously working transition zone, in some cases the transition may be discontinuous. In accordance to the invention the oxygen environment in one or more transition zones is always established in a way, that the concentration of dissolved oxygen will be greater than 0.5 mg/l. This environment and others influence an advanced biological P-uptake.

Thereby an anaerobic oxygen environment can be spreaded out at the bottom of the biotank, which is characterized by the partial or total lack of dissolved oxygen and of chemically combined oxygen too (after denitrification). This environment promotes denitrification and biological P-uptake.

Contrary to the wellknown knowledge it was a surprising experience with this invention, that it is possible to control and to regulate the changing and different oxygen environments in only one biotank in a way, that pressure is put on the microorganims in only one tank with only one technique which lead to a advanced combined denitrification and biological P-uptake.

The knowledge of the advanced biological P-uptake processes says that a chemical process has to be added or it was necessary to work with an additional separate tank volume with a total anaerobic environment. With this invention it is possible to operate with only one tank with only one technique. Thereby the necessary water return flow can be strongly reduced which is usually a multiple of the wastewater flow which has to be treated in the purification plant.

Sometimes in accordance to the technique a simultaneous and integrated nitrification/denitrification in combination with a biological P-uptake is known from the known techniques too, but in comparison with the claimed invention the processes in this techniques are better named as quasi-simultanous processes. The known techniques work with different oxygen environments respectively in the same tank too to handle nitrification and denitrification in combination with biological P-uptake, but the environmental conditions are adapted to different and changing times in the same volume or in strictly separated partitions of the volume. With this invention it is possible to create environmental zones with fluent conditions of the oxygen environmental aereas. Never before it was possible to realize such conditions of the environmental transition zones whereby the invention realize it with a simple and reliable technique.

Contrary to the temporal partitition (intermediate aeration) to create the different oxygen environmental conditions, e.g. beginning with aeration for the advanced nitrification followed by times without aeration in which the environmental change to anaerobic conditions (for denitrification) for which generally a seperate mixing or stirring apparatus is necessary whereby denitrification is followed by anaerobic environmental conditions by keeping up the time without aeration, the advantage of the invention is that optimal degradation environments for the different purification processes are observed at any time. Not one of these processes will suffer from one other integrated and simultaneous working process.

Contrary to the volumetric partition to create the different oxygen environmental conditions in which the processes will work in separate partitions of the tank volume the technique of the invention works with a high process stability in a simple way and with a low sequence of operation. Especially additional apparatuses and chemical admixtures are not necessary.

Operating the integrated and simultaneous working technique according to this invention with a concentration of biomass as a total of suspended activated sludge and sessil (fixed film) biomass with more than 3 kg dry solids per m$^3$ of the used biotank volume an advantageous variation of this technique according to the invention allows to increase the total biomass up to concentrations from 4 to 8 kg dry solids per m$^3$. Such a concentration of biomass is much higher than known from the other well-known techniques. Even 10 kg/m$^3$ are possible using this invention. The optimal process is reached with concentrations from 5 to 7 kg/m$^3$.

One characteristic of this invention is that the necessary oxygen environments for the different processes are establised coincidently in only one tank. Practically the aerobic environmental processes will operate in a favoured variation of the invention with concentrations of dissolved oxygen in a range from 1 to 4 mg/l. The optimum is a range from 1 to 3 mg/l.

In another favoured variation of the invention the anoxic processes prefer a concentration of dissolved oxygen less than 0.5 mg/l. Thereby the technique of the invention will be changed advantageously considering that at the same time the part of chemically combined oxygen compounds will reach a concentration of nearly 0 mg/l.

To understand the invention the following fact must be taken into consideration specially that the invention includes all processes which operate with different oxygen environmental zones in a biotank by controlling and regulating the oxygen input in a way that nearby the water surface an aerobic zone and nearby the bottom of the biotank an anoxic in transition to an anaeroic zone are established. Not only the modification of the three oxygen environmental zones aerobic, anoxic and anaerobic but the modification of the two oxygen environmental zones aerobic and anoxic is sufficient to achieve the advantages of the invention whereby it is practically favoured that the transition of the oxygen environmental zones works continuously with fluent conditions.

The different environmental zones or areas according to this invention are not separated in volumetric partitions but are established in different zones of water depth respectively water levels in the tank. Practically according to this invention nearly ½ up to ¾ of the total tank volume, favoured is a zone volume of ⅔ up to ¾ of the total volume, works with aerobic conditions.

Furthermore it is favoured according to the invention that the rest of the volume, ¼ up to ½ of the total volume, favoured is a part of ¼ up to ⅓ of the total volume, is operated with anoxic conditions.

Respecting the one or respectively more different transition zones it must be stated that in this transition zone the concentration of the dissolved oxygen will increase from the anoxic zone (at the bottom of the tank) to the aerobic zone (nearby the water surface). Especially the technique according to this invention is operating practically when the concentration of the dissolved oxygen in this transition zones will increase from the anoxic to the aerobic zone in a range from >0.5 up to <1 mg/l.

Another practical variation of the invention considers a concentration of the dissolved oxygen in the transition zone from the anoxic to the aerobic zone increasing in a range from 0 to 0.5 mg/l.

To operate the invented technique it is furthermore a special advantage that the different oxygen environmental conditions are maintained by regulating the oxygen input. Practically it is advantageous to control the concentration of the dissolved oxygen in the anoxic zone in short spaces of time and/or continuously to find out an actual value. More advantageous is to operate the technique of this invention with an additional control of the concentration of the dissolved oxygen in the aerobic zone continuously or in short spaces of time. This control measurement can be equiped with well-known commercial oxygen sensors.

Dependent on the measured actual values, which are measured as mentioned continuously or in short spaces of time, the actual value has to be approximated to a set-point value by regulating the oxygen input. The favoured set-point values for the oxygen concentrations in the special zones are mentioned above. According to this invention the regulation of the oxygen input to a set-point value of concentration is possible with many techniques well-known to the experts. A special arrangement of the technique according to this invention considers a simple and efficient equipment with a low amount of costs which effects the oxygen input by a cell segment contact aerator. Details of the cell segment contact aerators which are favoured for operating this technique according to the invention are described in the papers DE-A 29 14 689, DE-A 31 40 372 or DE-A 34 11 865 (CN 10 467). Practically the input of oxygen to reach the set-point oxygen value dependent on the measured actuel values is regulated by the number of revolutions of the contact aerator. Furthermore particular advantage is attained by measuring the actuel oxygen value in the biotank besides the cell segment contact aerator.

The different environmental conditions for the individual purification processes take place coincidently in the same volume of the biotank according to the technique of this invention. Working with cell segment contact aerators two variations of the technique has to be mentioned specially as a conclusion of the explanations above. In the first variation of the technique of this invention only aerobic and anoxic environmental conditions are established. An aerobic environment is always guaranteed in the centre, right next to the cell segment contact aerator and in the zone under the water surface independent from the number of revolutions of the cell segment contact aerator and in which an always high nitrification efficiency is guaranteed. At the bottom of the biotank and in some parts besides the contact aerator an anoxic environment is established to force advanced denitrification. The concentration of dissolved oxygen is adjustable by controling and regulating so that the anoxic environment can get anaerobic too.

In a second variation of the invented technique all environmental conditions aerobic, anoxic and anaerobic are established. In principle the mode of operation is the same as in the first variation but expanding the biotank volume besides and under the contact aerator an additional volume is created in which the anoxic environmental zones can increase and partially change into an anaerobic environment.

Altogether all variations in the mode of operation of the invented technique are characterised in that way that the microorganisms in the biotank have to work while the environmental conditions are changing permanently. This change will happen in remarkable shorter spaces of time (e.g. every minute) as in usual well known techniques where the change will happen just after hours in a separate tank volume. In the favoured variation equiped with a cell segment contact aerator an additional mixing apparatus is not necessary because the contact aerator cause not only the oxygen input but the mixing of the tank too.

As mentioned above using the concluded synergetic cooperation effects of two actions (Working with different oxygen environmental conditions and operating with a higher concentration of active biomass) it is possible to guarantee a higher efficiency, a higher stability of the process, a more economical operation and lower maintenance costs compared to other well known techniques.

Altogether an increase of the efficiency, specially using the higher purification efficiency by the specific degradation attributes of the suspended activated sludge and the fixed film biomass in the combination in this true hybrid system, an improvement of the biodegradation performances even when working with a higher hydraulic loading rate dependent on the higher concentration of the total biomass, an improvement of the activated sludge qualities, lower sludge indexes, a higher activated sludge concentration with up to 50% more dry solids caused by the part of suspended microorganisms with a lower sludge age, are reached.

The improved economy of the invented technique and even the enormous lower maintenance costs depend on one hand on the higher possible oxygen input, higher safety in operation, higher stability of the processes and on the other hand and in general on the simpleness of the in case installed mechanical equipment, specially of the contact aerators.

BRIEF DESCRIPTION OF THE DRAWINGS

Following the invention is described in detail by means of an example in accordance to the enclosed figure.

In the figure a section of the biotank is shown, equiped with two cell segments contact aerators, and a section of the final clarifier.

DESCRIPTION OF THE PREFERRED EMBODIMENTS

In this example the biotank 10 of the invented technique is equiped with two rotating cell segments contact aerators 30 which are rotantingly arranged around a central shaft in the biotank. For the rotation around the central shaft a contact aerator is using a motor drive system 40 which is not shown in detail in this figure. A oxygen sensor 50 is installed in the liquid of the biotank to measure the actual oxygen value. Dependent of the measured actual value the sensor regulates the motor drive system to control the number of revolutions of the contact aerators, which are in this example the cell segment contact aerators 30. The wastewater flows into the biotank through the influent 60. In the biotank an aerea 70 nearby the water surface is established which is called aerobic environmental zone. In this zone the concentration of dissolved oxygen is usually greater than 1.0 mg/l. Nearby the bottom of the biotank another environmental zone 80 is established. This is the anoxic environmental zone in which the concentration of dissolved oxygen is usually less than 0.5 mg/l. In the shown example a transition zone 90 between the aerobic zone 70 and the anoxic zone 80 is existent, in which the concentration of dissolved oxygen is in the range from 0.5 to 1.0 mg/l. The extension of this transition zone is for instance represented with the two light lines. The treated water flows out of the biotank 10 through the effluent 100 to the final clarifier 20. Return sludge is recycled through the outlet 120 from the final clarifier 20 to the inlet 140 into the biotank 10. Excess sludge is taken from the return sludge flow between final clarifier and biotank through the outlet 130. Through the effluent 110 purified water can leave the final clarifier.

In the invented technique preference is given to the mentioned cell segment contact aerators which are known and can be used in variations too, e.g. by use of a so-called pipe segments contact aerator. Together both contact aerators work as a true hybrid system, a combination of the activated sludge and the fixed film process. As mentioned above the contact aerators consists of several fixed film surfaces which are installed in a stationary position in the biotank under the water level and which may be submerged all the time or which can emerge periodically with the total fixed film surface area or with parts of them. The purification of the wastewater is effected on the one side by suspended activated sludge in the mixed liquor of the biotank 10 and on the other side by fixed film microorganisms in a biofilm on the roating surface areas of the contactors (so-called sessil biomass). The advantages of the activated sludge process are combined with those of the fixed film processes in only one technique. Specially the oxygen supply for the microorganisms is ensured by rotating the contact aerator slowly effected by an infinitely variable gear motor (frequency controlled gear motor) above water-level. As soon as a segment emerges with its chambers above water level during this rotation, the activated sludge of the mixed liquor inside the chambers runs out. The segment will then be filled with atmospheric air. The necessary oxygen for the biological wastewater treatment dissolves on the wet surfaces of the fixed biofilm. Because this very large surface area is directly disposed to the partial pressure of the air, an immediate saturation of the oxygen concentration is achieved. By diffusion oxygen penetrates into the deeper layers of the biofilm due to the concentration gradient.

While the segments are submerging again into the mixed liquor the air cannot escape any more and is trapped in the segments. The air is forced conducted to the bottom of the biotank and on this way the air is compressed more and more. During the downward rotation parts of the air can escape and are channeled in the form of middle fine and fine bubbles to the center of the aerator caused by the shape of the segments. Finally the bubbles reach the water surface trough the opposite segments and effect in combination with the rotation of the contact aerator a homogeneous mixing of the biotank and the sufficient supply of the mixed liquor with oxygen.

During the upward rotation of the contact aerator the partially airfilled segments provide buoyancy and reduce tremendously the propulsive power for rotation. Only a few moments before emerging again the rest of the air is being released into the water. The fixed film on the surface areas within the segments are supplied with oxygen up to saturation while passing the atmosphere. The forced conducted air is contacting again all inner surface areas of the plates or discs in the segments during rotation. By this all microorganisms of the fixed film are sufficiently supplied with oxygen during rotation in the mixed liquor too. The forced conducted air contacts the specially profiled surfaces of the plates and discs. Due to these profiles consistently new, innumerable transition zones are formed for the oxygen transfer under compresssed conditions of the trapped air. This results in the typical coincident oxygen supply for both components, fixed biofilm and suspended activated sludge.

To illustrate the efficiency of the invented technique the results of measurement from a model purification plant are explained which was specially dimensioned for an advanced nitrification. The total biomass as sum of the activated sludge and the fixed film biomass ranges from 5 to 10 kg dry solids per $m^3$. The average power consumption of the biostage was 5.6 kW. The total tank volume was 240 $m^3$. The volume load reach a value of 0.7 kg $BOD_5/(m^3 \cdot d)$.

The water depth in the biotank was nearly 4 m. The diameter of the installed cell segments contact aerator was 4.25 m whereby the distance between the bottom of the tank and the lowest point on the circuit of the contact aerator was 0,25 m. The contact aerator towers up nearly 0.5 m with its highest point on the circuit beyond the water surface of the biotank.

The concentration of dissolved oxygen was measured in the liquid of the biotank at 5 observation points nearby the cell segments contact aerator using commercial oxygen sensors.

Observation point 1 was installed in a water depth of 0.5 m or 3.5 m beyond the bottom.

Observation point 2 was installed in a water depth of 1.5 m or 2.5 m beyond the bottom.

Observation point 3 was installed in a water depth of 2.5 m or 1.5 m beyond the bottom.

Observation point 4 was installed in a water depth of 3.45 m or 0.55 m beyond the bottom.

Observation point 5 was installed in a water depth of 3.95 m or 0.05 m beyond the bottom.

The biomass was analysed as the concentration of dry solids.

Dependent on the measured actual values of the concentration of dissolved oxygen the numbers of revolutions of the contact aerator was regulated in a range from 0.3 to 1.0 revolutions per minute in such a way that the measured actual values shown in table 1 were constantly measured at the observation points 1–5.

Average values of each month of a test period of one year are listed.

The efficiency of the purification plant results from the figures listed in table 2.

The following parameters in the influent and the effluent of the plant were measured: Biological Oxygen Demand ($BOD_5$), Chemical Oxygen Demand (COD), Phosphats-Phosphorus ($PO_4$—P), Ammonium Nitrogen ($NH_4$—N), Nitrite Nitrogen ($NO_2$—N) and Nitrate Nitrogen ($NO_3$—N).

In table 2 the average values of each month of a test period of one year are listed.

By the shown results in table 2 it appears, that working with the invented technique an advanced nitrification and denitrification in combination with an advanced biological P-uptake is possible in only one biotank with one technique

TABLE 1

| Month | observation point | | | | | dry solids (kg/m³) |
|---|---|---|---|---|---|---|
| | 1 | 2 | 3 | 4 | 5 | |
| | concentration of dissolved oxygen (mg/l) | | | | | |
| January | 1.27 | 1.11 | 0.88 | 0.25 | 0.01 | 6.12 |
| February | 1.35 | 1.15 | 0.80 | 0.20 | 0.01 | 7.32 |
| March | 1.20 | 1.24 | 0.84 | 0.22 | 0.00 | 6.02 |
| April | 1.29 | 1.18 | 0.80 | 0.27 | 0.01 | 7.72 |
| May | 1.32 | 1.14 | 0.90 | 0.32 | 0.01 | 7.02 |
| June | 1.36 | 1.16 | 0.90 | 0.30 | 0.01 | 6.92 |
| July | 1.34 | 1.19 | 0.88 | 0.27 | 0.00 | 7.62 |
| August | 1.38 | 1.20 | 0.90 | 0.40 | 0.01 | 6.52 |
| September | 1.38 | 1.19 | 0.88 | 0.40 | 0.01 | 7.01 |
| October | 1.31 | 1.15 | 0.89 | 0.34 | 0.00 | 7.02 |
| November | 1.29 | 1.14 | 0.90 | 0.48 | 0.01 | 6.42 |
| December | 1.40 | 1.20 | 0.90 | 0.47 | 0.01 | 6.32 |

TABLE 2

| rate of flow (m³/d) 4–500 | influent BOD₅ (mg/l) | effluent BOD₅ (mg/l) | influent COD (mg/l) | effluent COD (mg/l) | influent PO₄—P (mg/l) | effluent PO₄—P (mg/l) | influent NH₄—N (mg/l) | effluent NH₄—N (mg/l) | influent NO₂—N (mg/l) | effluent NO₂—N (mg/l) | influent NO₃—N (mg/l) | effluent NO₃—N (mg/l) |
|---|---|---|---|---|---|---|---|---|---|---|---|---|
| January | 215 | 3 | 572 | 31 | 16.5 | 1.1 | 33.4 | 5.3 | 0.02 | 0.017 | 1.5 | 4.3 |
| Febuary | 190 | <3 | 432 | 32 | 12.1 | 1.0 | 28.4 | 3.6 | 0.02 | 0.01 | 0.9 | 4.0 |
| March | 200 | <3 | 476 | 34 | 15.4 | 0.9 | 41.3 | 3.8 | 0.017 | 0.02 | 1.1 | 4.3 |
| April | 250 | 3 | 510 | 37 | 18.9 | 1.2 | 27.4 | 5.8 | 0.18 | 0.017 | 1.6 | 3.0 |
| May | 190 | 3 | 490 | 32 | 16.8 | 0.9 | 31.4 | 4.0 | 0.17 | 0.04 | 4.0 | 2.4 |
| June | 220 | <3 | 343 | 34 | 12.4 | 0.9 | 43.4 | 2.4 | 0.21 | 0.17 | 3.3 | 2.5 |
| July | 230 | 3 | 422 | 35 | 11.8 | 0.7 | 41.3 | 3.2 | 0.17 | 0.16 | 3.2 | 1.8 |
| August | 208 | 3 | 364 | 31 | 14.3 | 1.0 | 36.4 | 3.0 | 0.46 | 0.21 | 4.1 | 1.4 |
| September | 190 | 3 | 491 | 36 | 11.8 | 1.2 | 38.0 | 4.3 | 0.34 | 0.28 | 2.2 | 1.4 |
| October | 210 | 3 | 460 | 34 | 13.4 | 0.9 | 38.4 | 3.1 | 0.23 | 0.17 | 2.8 | 2.3 |
| November | 190 | 3 | 417 | 36 | 13.4 | 1.0 | 39.4 | 4.0 | 0.43 | 0.23 | 3.4 | 4.5 |
| December | 180 | 3 | 410 | 32 | 11.9 | 0.9 | 34.3 | 4.5 | 0.43 | 0.36 | 3.4 | 4.4 |

What is claimed is:

1. A method for biological purification of wastewater as well as mechanical presettled wastewater, comprising the steps: degrading biologically nitrogen and phosphorous compounds in a biotank; operating said biotank with suspended activated sludge and with fixed film biomass for producing purified water directly removable from said biotank; controlling and regulating oxygen input to said biotank for operating said biotank under different oxygen environmental conditions; forming an aerobic zone near a water surface in said biotank; forming an anoxic zone near a bottom of said biotank, said aerobic zone and said anoxic zone being connectable with one another by at least one transition zone; and producing a total concentration exceeding 3 kilograms of dry solids per cubic meter of suspended activated sludge and fixed film biomass in used tank volume.

2. A method as defined in claim 1, wherein said total concentration is within a range of 4 to 8 kilograms per cubic meter.

3. A method as defined in claim 1, wherein said aerobic zone has a concentration of dissolved oxygen within a range of 1 to 4 miligrams per liter.

4. A method as defined in claim 1, wherein said anoxic zone has a concentration of dissolved oxygen less than 0.5 miligrams per liter.

5. A method as defined in claim 4, including chemically combined oxygen having a concentration of substantially 0 miligrams per liter.

6. A method as defined in claim 1, wherein said biotank is operated under aerobic environmental conditions with ½ to ¾ of a total tank volume.

7. A method as defined in claim 1, wherein said biotank is operated under anoxic environmental conditions with ¼ to ½ of a total tank volume.

8. A method as defined in claim 1, wherein dissolved oxygen in a transition zone between said anoxic zone and said aerobic zone has a concentration increasing within a range from greater than 0.5 miligrams per liter to less than 1 miligram per liter.

9. A method as defined in claim 1, dissolved oxygen in a transition zone between said anoxic zone and said aerobic zone has a concentration increasing within a range from greater than 0 miligrams per liter to 0.5 miligrams per liter.

10. A method as defined in claim 1, including the step of measuring continuously dissolved oxygen concentration in said anoxic zone to determine an actual values.

11. A method as defined in claim 1, including the step of measuring continuously dissolved oxygen concentration in said aerobic zone to determine an actual values.

12. A method as defined in claim 10, including the step of approximating said actual values of dissolved oxygen concentration to a set-point value by controlling and regulating oxygen input to said biotank.

13. A method as defined in claim 11, including the step of approximating said actual values of dissolved oxygen concentration to a set-input value by controlling and regulating oxygen input to said biotank.

14. A method as defined in claim 1, wherein said oxygen input to said biotank is applied by a cell segments contact aerator.

15. A method as defined in claim 14, wherein said contact aerator has a number of revolutions controlled to regulate a set-point value as a function of an actual value of dissolved oxygen concentration.

16. A method as defined in claim 15, wherein said biotank has a liquid outside said contact aerator; and measuring an actual value of dissolved oxygen concentration in said liquid.

17. A method for biological purification of wastewater as well as mechanical presettled wastewater, comprising the steps: degrading biologically nitrogen and phosphorous compounds in a biotank; operating said biotank with suspended activated sludge and with fixed film biomass for producing purified water directly removable from said biotank; controlling and regulating oxygen input to said biotank for operating said biotank under different oxygen environmental conditions; forming an aerobic zone near a water surface in said biotank; forming an anoxic zone near a bottom of said biotank, said aerobic zone and said anoxic zone being connectable with one another by at least one transition zone; and producing a total concentration exceeding 3 kilograms of dry solids per cubic meter of suspended activated sludge and fixed film biomass in used tank volume; integrating simultaneous nitrification and denitrification for biological phosphate elimination in only a single biotank, nitrification occurring in said aerobic zone, denitrification occurring in said anoxic zone, said aerobic zone having dissolved oxygen and chemically combined oxygen and said anoxic zone lacking said dissolved and said chemically combined oxygen, said transition zone having continuously graded oxygen environmental conditions for obtaining optimum environmental conditions.

* * * * *